F. X. MÜLLER.
HOSE COUPLING.
APPLICATION FILED SEPT. 24, 1915.
1,184,484.
Patented May 23, 1916.
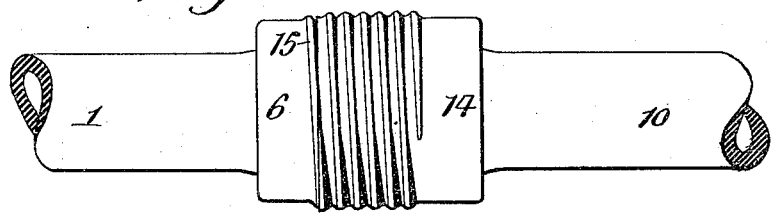
Fig. 1.
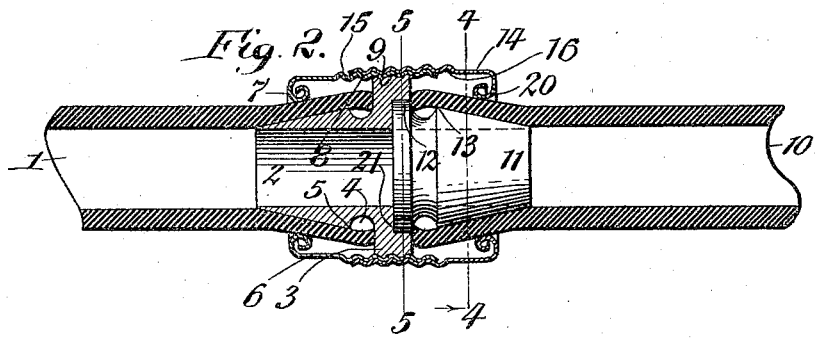
Fig. 2.
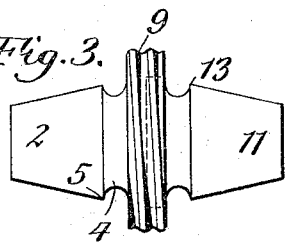
Fig. 3.
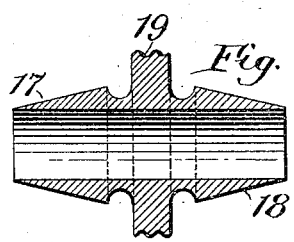
Fig. 6.
Fig. 7.
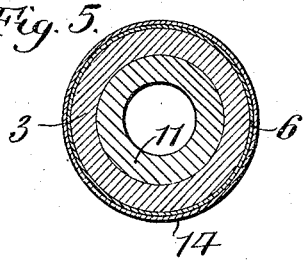
Fig. 5.
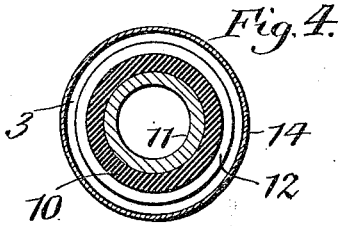
Fig. 4.
Inventor
Frank X. Müller
by Geyer & Popp Attorneys.

UNITED STATES PATENT OFFICE.

FRANK X. MÜLLER, OF BUFFALO, NEW YORK, ASSIGNOR TO REPUBLIC HOSE COUPLER CORPORATION, OF BUFFALO, NEW YORK, A CORPORATION OF NEW YORK.

HOSE-COUPLING.

1,184,484.   Specification of Letters Patent.   Patented May 23, 1916.

Application filed September 24, 1915. Serial No. 52,365.

*To all whom it may concern:*

Be it known that I, FRANK X. MÜLLER, a citizen of the United States, residing at Buffalo, in the county of Erie and State of New York, have invented new and useful Improvements in Hose-Couplings, of which the following is a specification.

This invention relates to a coupling for readily uniting sections of a hose or other flexible tubing.

The purpose of the invention is to provide a coupling which will insure a tight and strong union of the opposing ends of two hose sections by permitting first one of the sections to be engaged with the connecting ferrule and secured to the same after which the other section may be slipped over the other end of said ferrule and clamped thereto, so that a definite positive union of each hose section with the ferrule is effected.

In the accompanying drawings: Figure 1 is a side elevation of the hose coupling showing the same uniting two hose sections. Fig. 2 is a longitudinal section of the same. Fig. 3 is a side elevation of the two ferrule sections, one inserted in the other. Figs. 4 and 5 are transverse sections taken on the correspondingly numbered lines in Fig. 2. Fig. 6 is a longitudinal section of a modified form of ferrule in which the same is made in one piece of solid material. Fig. 7 is a vertical longitudinal section of another type of one piece ferrule made of sheet metal.

Similar characters of reference indicate corresponding parts throughout the several views.

In the preferred form of my coupling, the same is arranged so that it may be readily uncoupled without disturbing the union of either hose section with its respective ferrule section and as shown in Figs. 1, 2, 3, 4 and 5 the same is constructed as follows: 1 indicates one of the sections of a garden hose or other flexible tubing, the inner end of which is slipped over the outer end 2 of a female ferrule section, said outer end being preferably of conical form tapering outwardly to facilitate this operation. The inner end of this ferrule section is provided with an external annular supporting flange 3 against which the inner end of said hose section is adapted to bear. On the periphery of this ferrule section adjacent to the flange 3 is formed an annular groove 4 which forms a comparatively sharp circumferential corner or shoulder 5 at the inner or large end of the conical surface. Owing to the inner end of the hose section being distended, the extremity of the same contracts again slightly after being slipped over the conical surface of the ferrule section inasmuch as it overhangs the groove 4, thereby causing this extremity to grip the corner 5 of the ferrule section and assist in retaining the hose section on the same and insuring a water tight joint.

To retain the hose section positively on the ferrule section an inner clamping sleeve 6 is provided whose outer end is curled inwardly and then backwardly upon itself to form an internal bead 7 which presses the hose section tightly onto the coned surface of the female ferrule section when said inner clamping sleeve is caused to move inwardly. The latter movement is preferably accomplished by means of an internal screw thread 8 arranged at the inner end of said sleeve and adapted to engage an external screw thread 9 formed on the periphery of the flange 3.

The inner end of the other hose section 10 is now slipped over the outer conical end 11 of a male ferrule section until it bears against the outer face of a flange or tenon 12 similar to the action of the other hose section and similarly overhanging a circumferential corner or shoulder 13 at the large end of the conical surface of this male ferrule section. The flange or tenon 12 is adapted to fit into a recess or socket 21 which is formed at the inner end of the female ferrule section so that when said ferrule sections are pressed together, one fitting into the other, the same are retained transversely in line.

To simultaneously retain the ferrule sections together and to clamp the hose section 10 tightly onto the male ferrule section, an outer clamping sleeve 14 is provided similar to the inner clamping sleeve and similarly provided with an internal bead 20 at its outer end for clamping the hose section 10 against the outer conical surface of the male ferrule section. This outer clamping sleeve is provided at its inner end with an internal screw thread 16 adapted to engage with an external screw thread 15 which is formed on the inner end of the inner clamping sleeve. This detachable construction permits of readily uncoupling the hose sections, for instance, when the garden hose is to be used for washing automobiles or where a number of lengths of garden hose are to be connected to facilitate the watering of large estates.

Where, however, a cheaper coupling is desired lacking the detachable advantages of the preferred coupling, the cones 17, 18 and the supporting flange 19 of the ferrule may be constructed of one solid piece, as in Fig. 4, of wood, fiber or the like, or as in Fig. 7 of one piece of pressed sheet metal where greater durability is desirable. But in any of the forms, the coupling of the ends of hose sections for repairing or otherwise joining the same is very simple and positive. One hose end is slipped over one end of the ferrule and clamped to the same by screwing up the inner coupling sleeve 6 and then the other hose end is slipped over the opposite end of the ferrule and secured thereto by screwing up the outer clamping sleeve 14.

In use, the supporting flange 3 or 19 prevents the coupling from being crushed should it be inadvertently stepped upon and also prevents the threads from being flattened.

I claim as my invention:

1. A hose coupling comprising a tubular ferrule having conical ends adapted to engage with the interior of opposite ends of two hose sections and having the central part of its outer surface provided with a screw thread, and two clamping sleeves one of which is provided with an internal bearing bead adapted to engage with the outer side of the hose section on one of said conical ends and also provided with an internal screw thread engaging with the external thread of said ferrule, and the other one of said clamping sleeves having an internal bearing bead adapted to engage the outer side of the hose section on the other conical end and also having an internal screw thread engaging with an external thread on the other clamping sleeve.

2. A hose coupling comprising a tubular ferrule having conical ends adapted to engage with the interior of opposite ends of two hose sections and provided with an external annular flange arranged on the central portion thereof and adapted to bear against the opposing ends of the hose sections and provided with an external screw thread, and two clamping sleeves one of which is provided with an internal bearing bead adapted to engage with the outer side of the hose section on one of said conical ends and also provided with an internal screw thread engaging with the external thread of said ferrule and the other one of said clamping sleeves having an internal bearing bead adapted to engage the outer side of the hose section on the other conical end and also having an internal screw thread engaging with an external thread on the other clamping sleeve.

3. A hose coupling comprising a tubular ferrule having conical ends adapted to engage with the interior of opposite ends of two hose sections and having the central part of its outer surface provided with a screw thread, and two clamping sleeves one of which is provided with an internal bearing bead adapted to engage with the outer side of the hose section on one of said conical ends and also provided with an internal screw thread engaging with the external thread of said ferrule, and the other one of said clamping sleeves having an internal bearing bead adapted to engage the outer side of the hose section on the other conical end and also having an internal screw thread engaging with an external thread on the other clamping sleeve, said ferrule comprising two sections which are provided on their opposing ends with interlocking complementary surfaces.

4. A hose coupling comprising a tubular ferrule having conical ends adapted to engage with the interior of opposite ends of two hose sections and having the central part of its outer surface provided with a screw thread, and two clamping sleeves one of which is provided with an internal bearing bead adapted to engage with the outer side of the hose section on one of said conical ends and also provided with an internal screw thread engaging with the external thread of said ferrule, and the other one of said clamping sleeves having an internal bearing bead adapted to engage the outer side of the hose section on the other conical end and also having an internal screw thread engaging with an external thread on the other clamping sleeve, said ferrule comprising two sections one of which is provided on its inner end with a socket and the ferrule section being provided at its inner end with a tenon which engages said socket.

FRANK X. MÜLLER.